United States Patent [19]

Sugiura

[11] Patent Number: 5,144,604
[45] Date of Patent: Sep. 1, 1992

[54] OPTICAL INFORMATION READING APPARATUS HAVING AN OPTICAL INTEGRATION TYPE PICKUP

[75] Inventor: Satoshi Sugiura, Saitama, Japan

[73] Assignee: Pioneer Electronic Corporation, Tokyo, Japan

[21] Appl. No.: 527,480

[22] Filed: May 23, 1990

[30] Foreign Application Priority Data

Jul. 26, 1989 [JP] Japan .................................. 1-193350

[51] Int. Cl.⁵ ............................................. G11B 7/095
[52] U.S. Cl. ................................. 369/44.12; 369/112; 369/109; 369/114
[58] Field of Search ................... 369/112, 44.11, 44.12; 360/114, 13; 385/14

[56] References Cited

U.S. PATENT DOCUMENTS

| | | | |
|---|---|---|---|
| 4,716,559 | 12/1987 | Hine | 369/112 |
| 4,718,052 | 1/1988 | Kondo et al. | 369/112 |
| 4,737,946 | 4/1988 | Yamashita et al. | 369/112 |
| 4,779,259 | 10/1988 | Kono et al. | 369/112 |
| 4,887,255 | 12/1989 | Handa et al. | 369/122 |

FOREIGN PATENT DOCUMENTS 60263350 5/1986 Japan .
61-296540 12/1986 Japan .
2156069 10/1985 United Kingdom .

OTHER PUBLICATIONS

Optronics, 1989, pp. 149-154.
Shogo Ura et al, a Treatise entitled "An Integrated-Optic Disk Pickup Device", Department of Electronics, Faculty of Engineering, Osaka University.

Primary Examiner—Roy N. Envall, Jr.
Assistant Examiner—Khoi Truong
Attorney, Agent, or Firm—Sughrue, Mion, Zinn, Macpeak & Sons

[57] ABSTRACT

An optical information reading apparatus comprises an optical integration circuit type pickup in which an optical waveguide for guiding light and a condensing coupler for condensing the guided light propagating within the optical waveguide are formed on an optical integration circuit substrate, sub-couplers for radiating a part of the injected light upon the information recording surface in the vicinity of a light spot formed by the optical pickup and subsidiary light detection elements for receiving reflection light of the light radiated from the sub-couplers reflected from the information recording surface. The sub-couplers and the subsidiary light detection elements are formed integrally with the optical pickup on the optical integration circuit substrate. Thereby the detection error can be reduced, it is not necessary to use attachment parts and therefore the apparatus can be integrated to thereby make it possible to minimize the size.

6 Claims, 3 Drawing Sheets

OPTICAL INFORMATION READING APPARATUS HAVING AN OPTICAL INTEGRATION TYPE PICKUP

FIELD OF THE INVENTION

The present invention generally relates to an optical information reading apparatus such as a CD player, an LVD player or the like for optically reading information recorded on an information recording medium, and particularly relates to an optical information reading apparatus having an optical pickup using an optical integration circuit.

BACKGROUND OF THE INVENTION

Factors for determining the information reading accuracy in a CD player or an LVD player include skew (or tilt). Such skew is caused by warp of a disk per se, and in addition to such warp, particularly in the case of an LVD of a large diameter, a portion of the LVD projecting from a turntable may hang down, thus causing skew. This is because a turntable is restricted in size as much as possible so as to reduce the inertia of a rotary system and therefore an outer circumferential portion of an LVD projected over the turntable becomes inclined. In such away, the skew causes a state where the orthogonal relation between the information recording surface of a disk and the optical axis of an optical pickup cannot be maintained. As a result, the reading accuracy of a reading apparatus is reduced because the reading apparatus is based on the assumption that there is an orthogonal (or fixed-angular) relation between the optical axis and the information recording surface. In order to solve such a problem, a tilt detector is used to correct the tilt of an optical pickup corresponding to the skew.

FIG. 3 shows an example of the conventional tilt detector.

In this example, a tilt detector B is attached on the outside of an optical integration circuit type pickup A.

In the optical integration circuit type pickup A, a semiconductor laser 2 is provided on an end of an optical integration circuit substrate 1 so that light injected from the semiconductor laser 2 is guided to a condensing grating coupler 3 through an optical waveguide 4 formed in the optical integration circuit substrate 1. The light is condensed by an objective lens function of the condensing grating coupler 3 so as to form a main beam spot 8 upon an information recording surface. The light reflected from the information recording surface is returned to the condensing grating coupler 3 again, is guided through the optical waveguide path 4, is led to a Foucault prism 6 by means of a beam splitter 5, and is then applied to light detection elements 7a–7d. The light detection elements 7a–7d produce output voltages, respectively, in accordance with the incident light beams so that a focus error signal, a tracking error signal, and a read signal are obtained through operations performed upon the respective output signals of the light detection elements 7a–7d by means of an operator (not shown). Known examples of such an optical integration circuit type pickup A include those described in "LIGHT INTEGRATION DISK PICKUP HEAD" (OPTRONICS, 1989, No. 2, pp 149–154) and Japanese Patent Unexamined Publication No. 61-296540, etc.

The optical integration circuit type pickup A as described above is provided with the tilt detector B at its condensing grating coupler side as shown in FIG. 3. In the tilt detector B, first and second light sensors 11 and 12 are disposed on a substrate 9 at a predetermined interval, and a light source 10 is disposed at an intermediate portion between the sensors 11 and 12. An information recording surface is irradiated with light beams emitted from the light source 10, so that first and second sub-beam spots 13 and 14 are formed on the information recording surface at positions separated from each other. The respective beams reflected from the first and second sub-beam spots 13 and 14 are returned to the first and second light sensors 11 and 12. The tilt is detected by judging the quantities of light beams returned to the first and second light sensors 11 and 12. That is, if the optical axis is perpendicular to a disk 16 as shown in FIG. 4, the output voltage of the first light sensor 11 is equal to that of the second light sensor 12. If a tilt has occurred, on the contrary, one of the reflection beams 17 comes away from the second light sensor 12 as shown in FIG. 5. Consequently, a difference is generated between the respective output voltages of the first and second light sensors 11 and 12. It is therefore possible to detect the tilt on the basis of a signal representing the difference of the output voltages.

The foregoing conventional reading apparatus is disadvantageous in that a detection error is apt to be generated because the first and second sub-beam spots 13 and 14 caused by the tilt detector B are apart from the main beam spot 8 caused by the optical integration circuit type pickup A. The apparatus is complicated and large in size because it is necessary to use parts for attaching the tilt detector B on the optical integration circuit type pickup A. The increase in size of the apparatus is opposed to the requirement for minimizing an apparatus as much as possible because use of the attachment parts causes increase of the number of parts.

SUMMARY OF THE INVENTION

An object of the present invention is therefore to provide an optical information reading apparatus in which a detection error can be suppressed and the size of which can be reduced.

In order to solve the foregoing problems, according to the present invention, an optical information reading apparatus comprises an optical integration circuit type pickup in which an optical waveguide for guiding light injected from a light source and a condensing coupler for condensing the guided light propagating within the optical waveguide onto an information recording surface of a medium are formed on an optical integration circuit substrate, sub-couplers for radiating a part of the injected light upon the information recording surface in the vicinity of a light spot formed by the optical pickup and subsidiary light detection elements for receiving reflection light of the light radiated from the sub-couplers reflected from the information recording surface. The sub-couplers and the subsidiary light detection elements are formed integrally with the optical pickup on the optical integration circuit substrate.

According to the present invention, the sub-couplers are formed on the same substrate as the optical integration circuit substrate of the optical integration circuit type pickup, and light beams emitted from the sub-couplers radiate upon positions in the vicinity of the light spot formed by the optical integration circuit type pickup. The reflection beams are incident upon the subsidiary light detection elements formed on the optical integration circuit substrate of the optical integration circuit type pickup similarly to the case of the sub-couplers so as to perform detection of tilt. The detection error can be reduced because light beams from the sub-couplers radiate upon positions in the vicinity of the light spot of the optical integration circuit type pickup. Further, it is not necessary to use attachment parts because the sub-couplers and the subsidiary light detection elements are formed on the same substrate as the optical integration circuit type pickup so as to be integrated with each other, and therefore the apparatus can be integrated to thereby make it possible to minimize the size.

DETAILED DESCRIPTION OF PREFERRED EMBODIMENT

Next, an embodiment of the present invention will be described with reference to the accompanying drawings.

Figure 1:
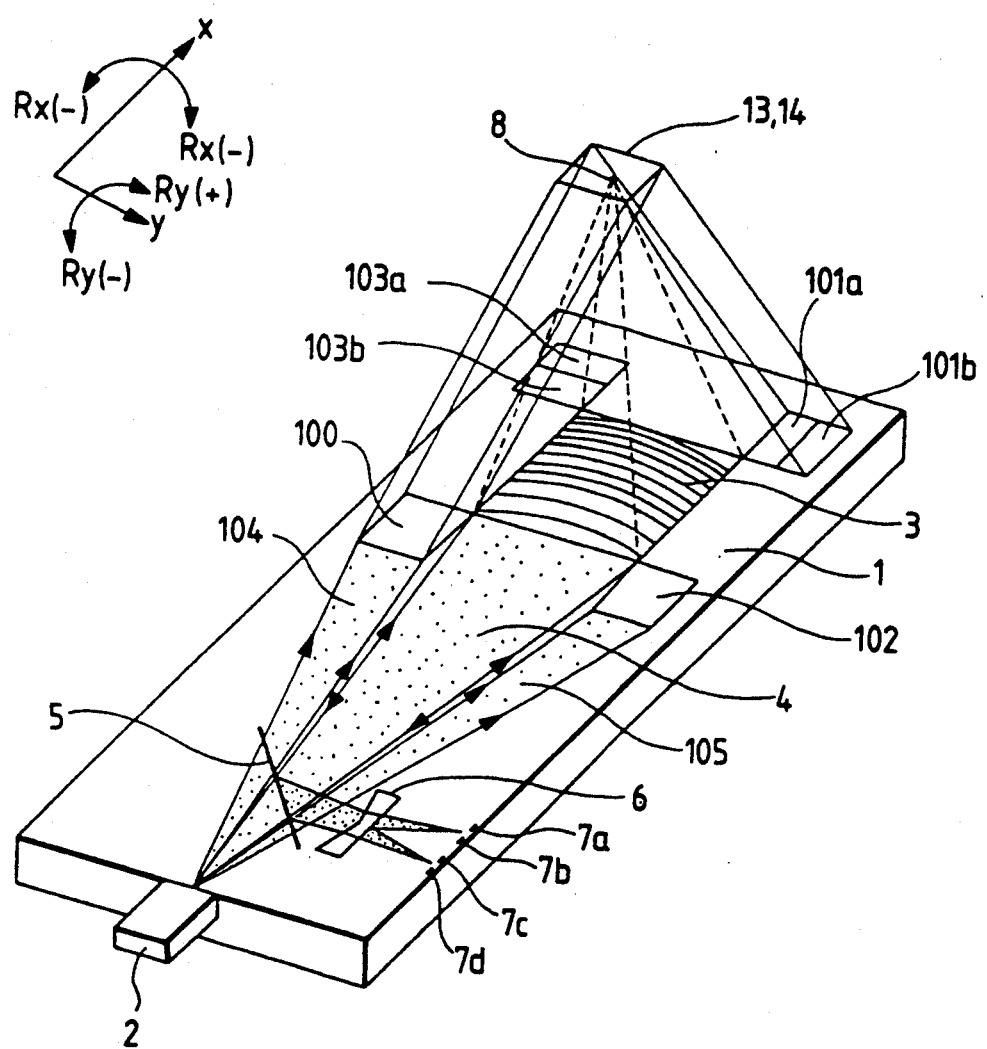
FIG. 1 is a perspective view showing an embodiment of the present invention.
Figure 3:
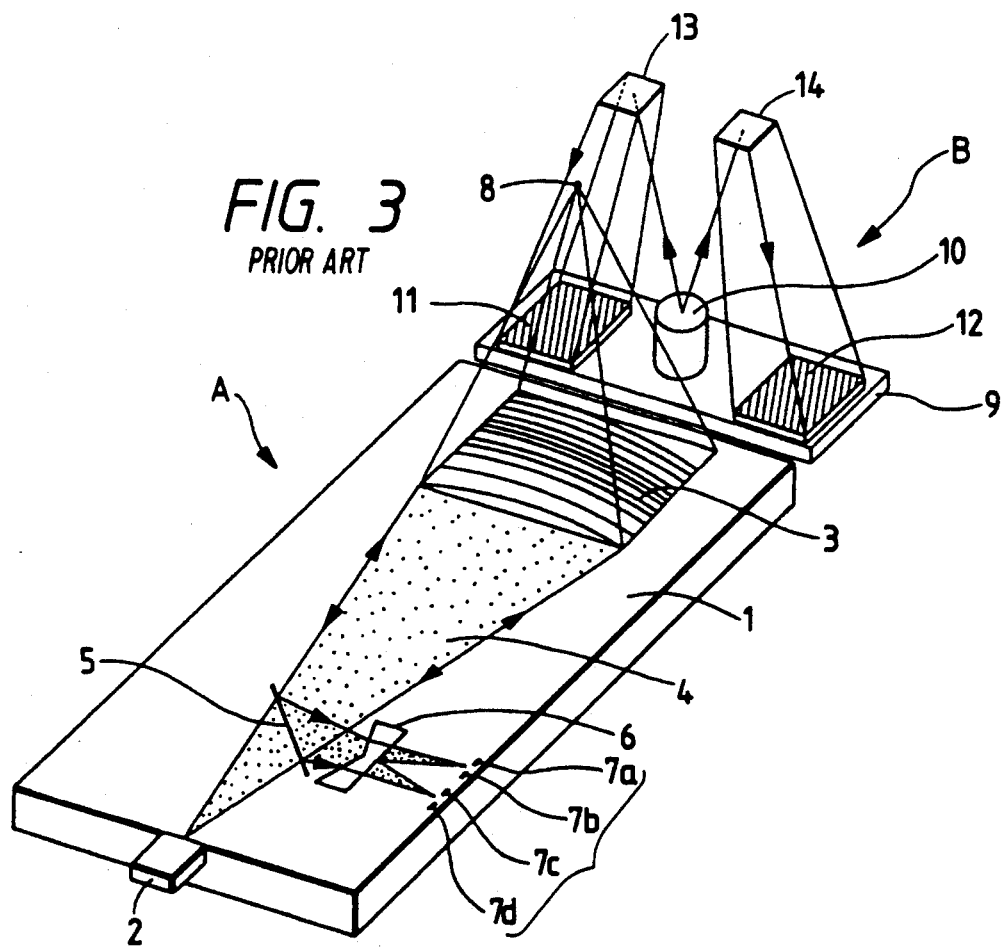
FIG. 3 is a perspective view showing the conventional optical integration circuit type pickup and tilt detector.
Figure 4:
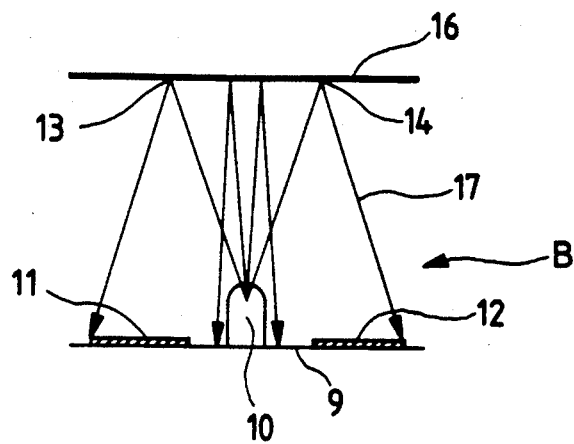
FIGS. 4 and 5 are views for explaining the principle of detection of tilt.
Figure 5:
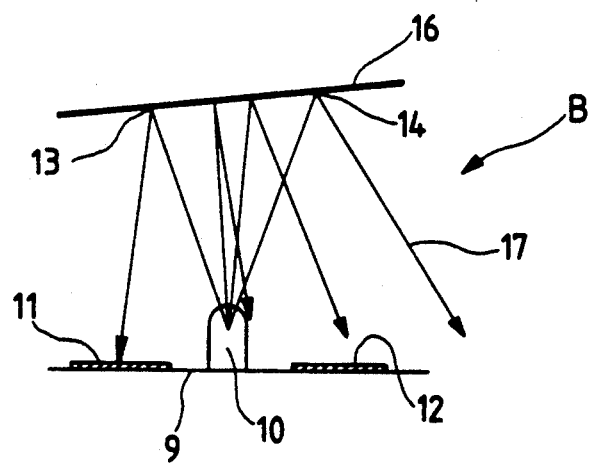

FIG. 1 shows an embodiment of the present invention. In this embodiment, portions which are the same as those in the conventional example of FIG. 3 are referenced correspondingly and a detailed description thereof is omitted.

Figure 2:
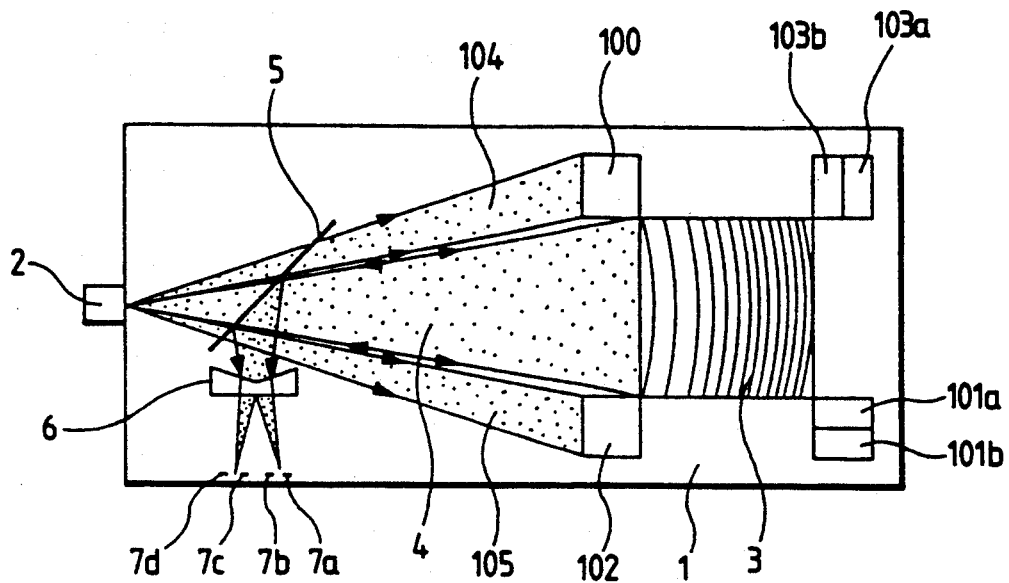
FIG. 2 is a plan view of the same embodiment.

This embodiment of FIG. 1 is different from the conventional example of FIG. 3 in the following points. That is, a first sub-coupler 100 is formed on an optical integration circuit substrate 1 at a position adjacent to a corner of a condensing grating coupler 3, and first subsidiary light detection elements 101a and 101b are formed so as to be diagonally coupled with the first sub-coupler 100. A second sub-coupler 102 is formed on the other corner and second subsidiary light detection elements 103a and 103b are formed so as to be diagonally coupled with the second sub-coupler 102. First and second subsidiary optical waveguides 104 and 105 are formed to guide light injected from a semiconductor laser 2 to the first and second sub-couplers 100 and 102 respectively. FIG. 2 shows the plane arrangement of various portions.

The first and second sub-couplers 100 and 102 are formed, for example, by gratings, so as to send parallel flux of light upon a recording surface of a disk 16 in this embodiment. The light may be converged once similarly to the case of the condensing grating coupler 3, or may be diverged once.

The first subsidiary light detection element is divided into the first subsidiary light detection elements 101a and 101b in the y-direction so as to detect the tilt $R_{x(+)}$ or $R_{x(-)}$ of the disk 16 in the direction around the x-axis. It is possible to detect the direction and quantity of the tilt around the x-axis by detecting a difference in output voltage between the first subsidiary light detection elements 101a and 101b.

The second subsidiary light detection element is also divided into the second subsidiary light detection elements 103a and 103b in the x-direction so as to detect the tilt $R_{y(+)}$ or $R_{y(-)}$ of the disk 16 in the direction around the y-axis. It is possible to detect the direction and quantity of the tilt around the y-axis by detecting a difference in output voltage between the second subsidiary light detection elements 103a and 103b.

The foregoing first sub-coupler 100, the first subsidiary light detection elements 101a and 101b, the second sub-coupler 102, the second subsidiary light detection elements 103a and 103b, and the first and second optical waveguides 104 and 105 are formed by the same producing process as that of the optical integration circuit type pickup A.

Next, the operation will be described.

Light injected from the semiconductor laser 2 is guided to the condensing grating coupler 3 through an optical waveguide 4 to thereby form a main beam spot 8 in the same manner as in the conventional example.

A part of the light injected from the semiconductor laser 2 is guided to the first and second sub-couplers 100 and 102 through the first and second subsidiary optical waveguides 104 and 105 respectively.

The light diffracted in the first subsidiary coupler 100 radiate upon the position the same as or in the vicinity of the main beam spot 8. The light reflected from the information recording surface are entered into the first subsidiary light detection elements 101a and 101b. At this time, if the information recording surface of the disk 16 is perpendicular to the optical axis of the condensing grating coupler 3, the output voltage of the first subsidiary light detection element 101a is equal to that of the first subsidiary light detection element 101b so that the difference between the output voltages is zero. If the disk 16 is inclined in the direction of $R_{x(+)}$ or $R_{x(-)}$, on the contrary, the light beams are not equally incident into the first subsidiary light detection elements 101a and 101b to thereby generate a difference in output voltage therebetween so that the direction and quantity of tilt can be detected from the voltage difference.

The light diffracted in the second sub-coupler 102, on the other hand, radiates upon the position the same as or in the vicinity of the main beam spot 8. The light reflected from the information recording surface is entered into the second subsidiary light detection elements 103a and 103b. At this time, if the information recording surface of the disk 16 is perpendicular to the optical axis of the condensing grating coupler 3, the output voltages of the second subsidiary light detection elements 103a and 103b are equal to each other so that a difference between the output voltages of the elements 103a and 103b is zero. If the disk 16 is inclined in the direction of $R_{y(+)}$ or $R_{y(-)}$, on the contrary, the light beams are not equally incident into the second subsidiary light detection elements 103a and 103b to thereby generate a difference in output voltage therebetween so that the direction and quantity of tilt can be detected from the voltage difference.

Although description has been made such that the first and second sub-beam spots 13 and 14 are formed at the position the same as the main beam spot 8 (as shown in FIG. 1) in the foregoing embodiment, the sub-beam spots 13 and 14 may be formed in the vicinity of the main beam spot 8 if the optical integration circuit type pickup A per se is small.

Further, although description has been made as to the case where the present invention is applied to a tilt detector in the foregoing embodiment, it is possible to detect the existence of the disk 16 or to detect the reflection factor of the information recording surface on the basis of the existence of the output voltages of the first subsidiary light detection elements 101a and 101b or the second subsidiary light detection elements 103a and 103b.

Moreover, if an arithmetic circuit for making differential calculations based on the first subsidiary light detection elements 101a and 101b and between the second subsidiary light detection elements 103a and 103b is formed on the optical integration circuit substrate 1, although it is not illustrated, it is possible to further reduce the number of parts. In this case, the formation of the arithmetic circuit can be realized by adding a process for forming a transistor region and a wiring region to the producing process of the optical integration circuit.

As described above, according to the present invention, the optical integration circuit type pickup is formed integrally with the tilt detector so as to make irradiation points of light beams close to each other to thereby make it possible to reduce the tilt detection error and to minimize the size of the reading apparatus.

What is claimed is:

1. An improvement for an optical information reading apparatus, said improvement comprising:
    an optical integration circuit type pickup in which an optical waveguide for guiding light injected from a light source and a condensing coupler for condensing the guided light propagating within said optical waveguide onto an information recording surface of a medium are formed on an optical integration circuit substrate;
    sub-couplers for radiating a part of said injected light upon said information recording surface in the vicinity of a light spot formed by said optical pickup; and
    subsidiary light detection elements for receiving reflection light of said light radiated from said sub-couplers reflected from said information recording surface;
wherein said sub-couplers and said subsidiary light detection elements are formed integrally with said optical pickup on said optical integration circuit substrate.

2. The invention according to claim 1, wherein said subsidiary light detection elements are divisionally provided so as to be able to produce output signals respectively in accordance with the quantities of reception light and corresponding to the direction of tilt of said information recording surface.

3. An optical integration circuit type pickup for use in an optical information reading apparatus, said optical integration circuit type pickup comprising:
    optical waveguide means for propagating light from a light source means in an optical integration circuit substrate;
    condensing grating coupler for condensing light propagating through said optical waveguide means to form a main beam spot upon an information recording surface of a medium;
    beam splitter for leading reflected light from said main beam spot into light detecting means;
    subsidiary optical waveguide means for propagating part of light from said light source to sub-coupler means;
    said sub-coupler means formed at a position adjacent to a corner of said condensing grating coupler for radiating upon a position in the vicinity of said main beam spot; and
    subsidiary light detection means for receiving a reflected light form said sub-coupler means.

4. The optical integration circuit type pickup as claimed in claim 3, wherein said subsidiary light detection means is halved into a first light detection element and a second light detection element.

5. The optical integration circuit type pickup as claimed in claim 3, wherein said sub-coupler means comprises first and second sub-coupler means formed at a position adjacent to first and second corner of said condensing grating means respectively, and said subsidiary light detection means comprises first and second light detection means being diagonally coupled with said first and second sub-coupler means for receiving a reflected light from said first and second sub-coupler means respectively.

6. The optical integration circuit type pickup as claimed in claim 3, wherein said first light detection means is halves into first light detection element and second light detection element in a Y direction, and second light detection means is halves into third light detection element and fourth light detection element in X direction.

* * * * *